(No Model.)

T. A. MORROW.
POTATO DIGGER.

No. 359,091. Patented Mar. 8, 1887.

Witnesses:
J. J. Connel Jr.
R. B. Seward.

Inventor:
T. A. Morrow
By E. O. Seward,
atty

UNITED STATES PATENT OFFICE.

THOMAS A. MORROW, OF AVERY, OHIO.

POTATO-DIGGER.

SPECIFICATION forming part of Letters Patent No. 359,091, dated March 8, 1887.

Application filed November 15, 1886. Serial No. 218,930. (No model.)

*To all whom it may concern:*

Be it known that I, THOMAS A. MORROW, of Avery, in the county of Erie and State of Ohio, have invented certain new and useful Improvements in Potato-Diggers; and I do hereby declare the following to be a full, clear, and exact description of the invention, such as will enable others skilled in the art to which it appertains to make and use the same.

My invention relates to an improvement in potato-diggers, and more particularly to that class of diggers in which an endless carrier is adapted to move the potatoes, and the soil immediately around them, which have been elevated from the ground by an advancing blade, rearwardly for the purpose of separating the soil from the potatoes and depositing the potatoes in a suitable receptacle or on the top of the ground at the rear of the machine.

The object is to provide more effective means for separating the soil from the potatoes during their rearward passage.

With this end in view my invention consists in a rotary separator located below the path along which the mingled potatoes and soil travel, and adapted to lift, loosen, and pulverize the soil during its passage.

My invention further consists in an endless carrier composed of a series of endless chains or belts independent of one another, in combination with a rotary separator, whereby the arms of the rotary separator are allowed to travel between the chains at the desired speed.

My invention further consists in certain features of construction and combinations of parts, as will be hereinafter described, and pointed out in the claims.

Figure 1:
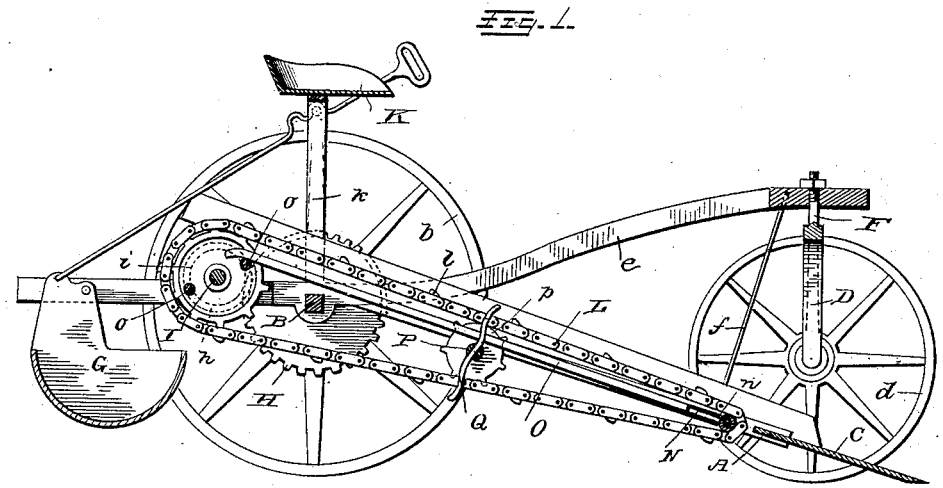
Figure 2:
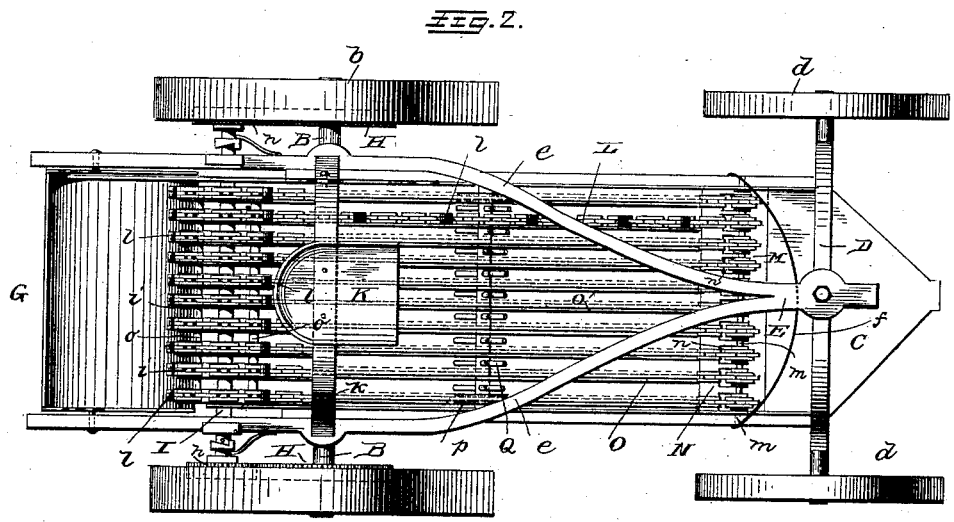
Figure 3:
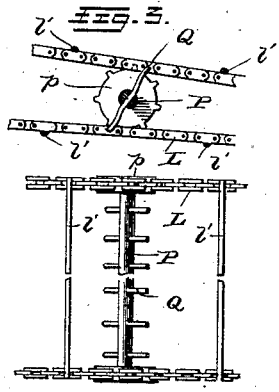

In the accompanying drawings, Figure 1 is a view of the digger in longitudinal vertical section. Fig. 2 is a plan view; and Fig. 3 represents a modified construction of the endless carrier.

The supporting-frame consists of a pair of side rails, A, secured to a rear axle, B, and connected together at the forward end by a flat taper-nosed digging-blade, C.

The rear axle, B, is supported by a pair of ground-wheels, *b*, loosely mounted on its ends, and the forward or digging-blade end of the supporting-frame is secured in vertical adjustment relatively to an arched axle, D, supported by a pair of forward ground-wheels, *d*, as follows: A reach consisting of a pair of branches, *e*, secured to the rear axle, B, in close proximity to the side rails, A, and converging as they extend forwardly and upwardly toward the crown of the arched axle D, unite just before they reach the arched axle and form a single bar, E. The latter is secured in vertical adjustment to a king-bolt, F, extending upwardly from the crown of the arch, and the digging-blade end of the supporting-frame is secured to the reach E by a curved brace, *f*, extending from one rail A to the other through the reach, or in engagement with a suitable fastening for securing it to the reach. The branches *e* of the reach are conveniently extended rearwardly beyond the rear axle, and form a support for a tilting receptacle, G, in which the potatoes are collected as they fall from the endless carrier or riddle. The ground-wheels *b* have gear-wheels H secured to their hubs, which mesh with pinions *h*, secured to a cross-shaft, I, journaled in suitable bearings attached to the sides of the supporting-frame a short distance to the rear of the axle B. The cross-shaft I actuates the endless carrier.

A driver's seat, K, is conveniently supported upon curved standards, or an arched bar, *k*, having its ends secured to the side rails at the rear axle, or the rear axle itself, and an operating-rod for tilting the receptacle G and dumping out the potatoes extends from the receptacle G to a point within easy reach of the driver.

The parts as thus far described are quite similar in their construction and arrangement to those which appear in what is commonly known as the "McCallum Digger," for which Letters Patent No. 149,051 were granted on March 31, 1874, the features of my present invention being essentially the introduction of the separator beneath the working-face of the carrier to prevent the wedging and chafing of the potatoes and to loosen and pulverize the soil as it is carried along, and the introduction of a novel endless carrier.

The cross-shaft I is provided with a series of sprocket-wheels, *i*, located at such a distance apart that the sprocket chains or belts L, which pass over them, will be near enough together to prevent merchantable potatoes from falling through between. The chains L are independent of one another, there being no cross-pieces to connect them, and hence they serve as a screen, consisting in effect of a series of parallel bars, and at the same time serving to carry the potatoes and soil from the blade C rearwardly. To give them a more effectual hold upon the potatoes and soil, the links are provided at intervals with lugs l, as shown. The several chains or belts L, positively driven by the sprocket-wheels i on the shaft I, pass over a series of rollers, M, loosely mounted on a cross-bolt, m, connecting the sides A of the frame near the rear edge of the blade C, and in a position to engage the potatoes and soil as they are elevated from the ground by the blade and slid backwardly by the advance of the digger.

The rollers M are conveniently held at the proper distance apart by the walls of slots n, cut in the edge of a plate or leaf, N, hinged on the bolt m and extending transversely between the sides A. To or in the rear edge of the leaf N are secured the riddle-bars O, which extend rearwardly a little below the upper faces of the chains or bolts L, their rear ends resting between the sprocket-wheels i on tappet-rods o, extending parallel with the shaft I between each two adjacent wheels.

The function of the riddle is to catch any potatoes which by chance work down between the chains L, and also to catch and break the lumps of soil and hold them in contact with the stirring-arms of the separator. As the shaft I revolves the tappets o alternately raise and release the rear ends of the riddle-bars and cause them to shake the soil from between them.

The separator consists of a shaft, P, journaled in suitable bearings attached to the side rails, A, at points preferably about midway between the blade C and rear axle, B. On each end of the shaft P is secured a sprocket-wheel, p, adapted to engage the outside sprocket chain or belt, L, and be positively driven thereby. The shaft P is further provided with series of curved arms or teeth Q, preferably with two series formed by inserting metal rods of suitable size transversely through the shaft, and allowing them to project far enough on opposite sides thereof to travel between the chains L and riddle-bars O, and project a short distance above the upper face of the chains into engagement with the potatoes and soil being carried thereon. The arms Q travel in the same direction as the chains, with their convex sides to the rear, and thus serve to urge the potatoes rearwardly and at the same time lift the lumps of soil and loosen the whole mass from the carrier, causing the soil to become pulverized and to completely separate from the potatoes before it reaches the rear end of the carrier.

In the modification shown in Fig. 3 the endless carrier is formed of a lesser number of chains connected by cross-strips l', and the teeth of the separator are shortened enough to prevent them projecting above or below the upper and lower faces of the chains into engagement with the cross-pieces.

It is evident that the riddle-bars might be dispensed with, the endless chains or belts themselves forming the screen, and that the arms or teeth Q might be of different construction and secured to the shaft in other ways, and that numerous slight changes in the form and arrangement of the several parts might be resorted to without departing from the spirit and scope of my invention; hence I do not wish to limit myself strictly to the construction herein set forth; but, Having fully described my invention, what I claim as new, and desire to secure by Letters Patent, is—

1. In a potato-digger, the combination, with a suitable supporting-frame and digging-blade and an endless belt-carrier adapted to move the potatoes and soil rearwardly from the blade, of a rotary shaft located beneath the carrier and provided with series of arms adapted to project upwardly into contact with the moving potatoes and soil, and motion-transmitting mechanism connecting the said rotary shaft with a drive-shaft, whereby the soil is lifted and effectually pulverized while being forced rearwardly by the carrier, substantially as set forth.

2. In a potato-digger, the combination, with a screen adapted to move the potatoes and soil rearwardly from the digging-blade, of a positively-driven rotary separator located beneath the screen and provided with arms adapted to travel between the bars of the screen, whereby the soil is lifted, and pulverized, and clogging prevented during its rearward passage, substantially as set forth.

3. In a potato-digger, the combination, with a screen adapted to move the potatoes and soil rearwardly from the digging-blade, of a rotary separator located beneath the screen and provided with curved arms adapted to travel between the bars of the screen, sprocket-wheels secured to the separator-shaft, and sprocket-chains connecting the separator with the ground-wheel shaft, whereby the separator is positively driven at the desired speed, substantially as set forth.

4. In a potato-digger, the combination, with an endless carrier adapted to force the potatoes and soil rearwardly from the digging-blade, and a riddle located below the carrying-face of the endless carrier, of a rotary separator located beneath the riddle, and provided with arms extending upwardly between the bars of the riddle into engagement with the potatoes and soil, substantially as set forth.

5. In a potato-digger, the combination, with an endless carrier consisting of a series of independent chains or belts, of a rotary separator located below the carrier and having arms adapted to travel between the independent chains or belts of the endless carrier, sprocket-wheels secured to the separator-shaft, and sprocket-chains connecting the said sprocket-wheels with corresponding sprocket-wheels on the driving-shaft, substantially as set forth.

6. In a potato-digger, the combination, with a series of sprocket-wheels on a drive-shaft and a series of corresponding rollers mounted on a counter-shaft, of a series of independent sprocket-chains mounted on the said sprocket-wheels and rollers to form an endless carrier, substantially as set forth.

7. In a potato-digger, the combination, with a four-wheeled support, a vertically-adjustable frame supported thereon, and a digging-blade, riddle, and endless carrier secured to the frame, of a rotary separator journaled in the frame below the riddle and driven by sprocket-chains actuated by the ground-wheels, the separator being provided with arms extending between the bars of the riddle and endless carrier, substantially as set forth.

In testimony whereof I have signed this specification in the presence of two subscribing witnesses.

THOMAS A. MORROW.

Witnesses:
CHARLES M. SCHWAB,
H. T. KELLOGG.